United States Patent [19]

Johnston

[11] Patent Number: 4,509,869
[45] Date of Patent: Apr. 9, 1985

[54] SELF-GREASING BEARING

[76] Inventor: Kenneth R. Johnston, 2517 43rd St., Bellingham, Wash. 98226

[21] Appl. No.: 550,369

[22] Filed: Nov. 10, 1983

[51] Int. Cl.³ .................. F16C 33/58; F16C 33/66
[52] U.S. Cl. ................................. 384/462; 384/513
[58] Field of Search ............ 308/187, 187.1, 189 R, 308/193, 195, 207 R, 212, 213, 216

[56] References Cited

U.S. PATENT DOCUMENTS

| 1,390,717 | 9/1921 | Keiper | 384/616 |
|---|---|---|---|
| 1,920,326 | 8/1933 | Schuck et al. | 308/187 |
| 2,219,031 | 10/1940 | Frauenthal et al. | 308/217 |
| 2,959,457 | 11/1960 | Szymalak | 308/187 |
| 3,096,129 | 7/1963 | Hay | 308/187 |
| 3,450,449 | 6/1969 | Sibley et al. | 308/187 |
| 3,597,031 | 8/1971 | Bill | 308/187 |
| 3,753,605 | 8/1973 | Lehmann | 308/187 |
| 3,860,302 | 1/1975 | Gregg | 308/187 |
| 3,980,359 | 9/1976 | Wetherbee, Jr. | 308/187 |

Primary Examiner—John Petrakes
Assistant Examiner—David Werner
Attorney, Agent, or Firm—Lee, Smith & Zickert

[57] ABSTRACT

A bearing including inner and outer concentric races, a cage member disposed between the races and having pockets for receiving rolling elements maintained in rolling engagement with the races, seals for preventing the loss of lubricant, and means between the races for continually directing lubricant from areas of build-up to the rolling elements.

6 Claims, 4 Drawing Figures

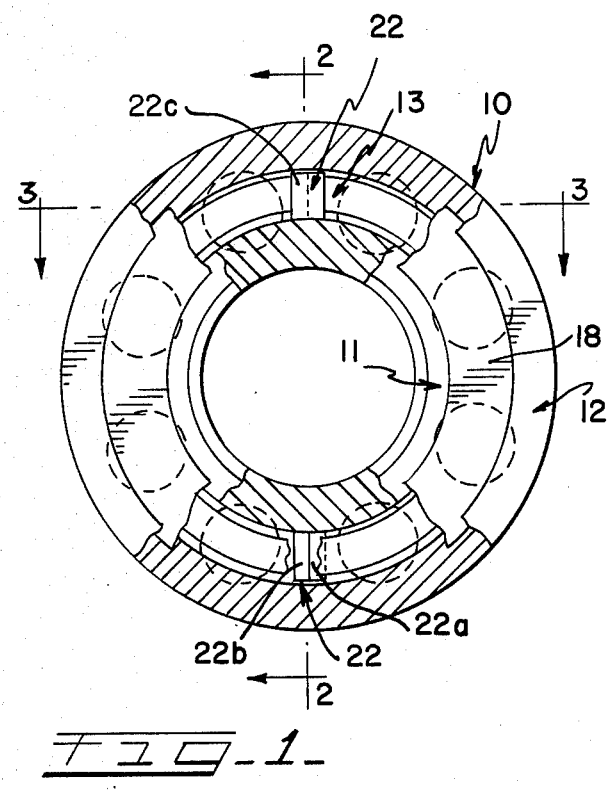
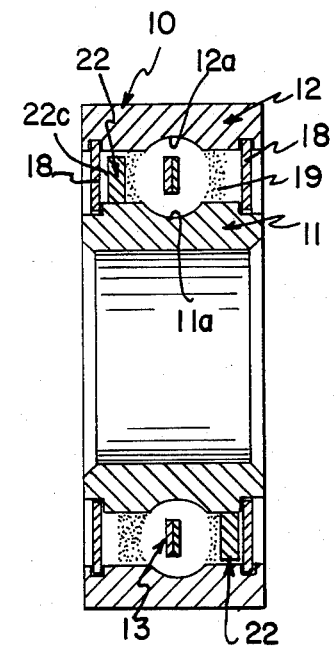
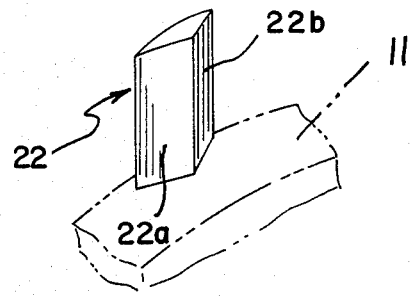
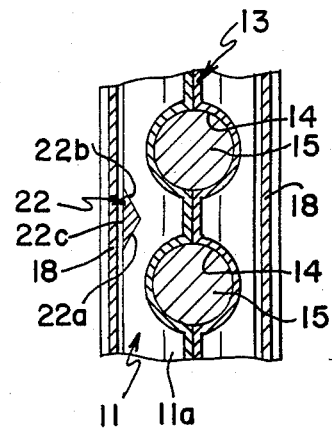

SELF-GREASING BEARING

This invention relates in general to a bearing, and more particularly to an improved bearing having lubricating means for directing lubricant toward the movable elements, and still more particularly to a lubricated bearing having means for continually transferring lubricant from areas of lubricant build-up to areas needing lubricant.

BACKGROUND OF THE INVENTION

Heretofore, it has been well known to provide bearings having rolling elements with lubricant that is retained within the bearing. For example, it has been known to provide a prelubricated ball bearing assembly including inner and outer concentrically arranged races, a cage concentrically disposed between the races and having pockets for receiving ball members held in engagement with the races, and lubricant seals at opposite sides for sealing in lubricant between the races and around the ball members. However, it has also been well known that in such a bearing assembly the lubricant tends to move out toward the seal members and/or against the normally fixed race, thereby ultimately depriving the ball members of adequate lubrication. Lack of proper lubrication leads to failure of the bearing assembly.

SUMMARY OF THE INVENTION

The present invention overcomes the difficulties of lubrication above noted by diverting the lubricant from the lubricant build-up areas back to the ball members to maintain adequate lubrication of the ball members and ball raceways, thereby enhancing the life of the bearing assembly. The means for directing the lubricant back to the ball members is in the form of scraper or diverting elements disposed adjacent to the seal members and on the rotatable race whereby the diverter elements direct the lubricant normally building up on the seal members toward the ball members.

It is therefore an object of the present invention to provide a new and improved bearing assembly having a lubrication system which materially increases the life of the assembly.

Another object of the present invention is in the provision of a pre-lubricated bearing assembly having means for directing lubricant from build-up areas toward the rolling elements and the corresponding race engaging surfaces to enhance the lubrication of the rolling elements.

A further object of the present invention is to provide a bearing assembly having inner and outer races, rolling elements between the races, seals at opposite sides of the races preventing the loss of lubricant and diverter elements on at least one of the races for directing lubricant along the seal members back toward the rolling elements.

Other objects, features and advantages of the invention will be apparent from the following detailed disclosure, taken in conjunction with the accompanying sheet of drawings, wherein like reference numerals refer to like parts.

BRIEF DESCRIPTION OF THE DRAWINGS

FIG. 1 is a side elevational view of a bearing assembly according to the present invention with some parts broken away and other parts shown in dotted lines;

FIG. 2 is a vertical sectional view taken through the bearing of the invention and generally along line 2—2 of FIG. 1;

FIG. 3 is a horizontal transverse sectional view taken through one part of the bearing of the present invention and generally along line 3—3 thereof; and FIG. 4 is a greatly enlarged perspective view of one of the diverter elements mounted on a fragmentary section of the inner race.

DESCRIPTION OF THE PREFERRED EMBODIMENTS

Referring now to the drawings, it will be appreciated that the bearing illustrated is of the type having ball members as rolling elements for purposes of illustrating the invention, and that the invention could likewise apply to a bearing where the rolling elements would be in the form of roller members.

The bearing illustrated is generally designated by the numeral 10 and includes inner and outer concentrically arranged races 11 and 12. Disposed concentrically between the inner and outer races is a cage member 13 having a plurality of circumferentially spaced apart pockets 14 receiving ball members or balls 15. The cage retains the balls in spaced relation while allowing them to freely rotate. The outer surface of the inner race 11 includes an annular ball groove 11a, while the inner surface of the outer race 12 includes an annular ball groove 12a, the grooves providing tracks for the ball members 15. Thus, the ball members roll in the grooves 11a and 12a during the relative movement of one race to the other.

Annular seal members 18 are disposed at opposite sides and between the races for the purpose of covering the side openings between the races and maintaining a suitable lubricant 19 within the races and around the ball members. For example, the lubricant may be a suitable grease of a type that would provide the desired lubrication. The seal members may be held in place by any suitable arrangement, and accordingly, it will be appreciated that the invention contemplates a pre-lubricated bearing.

Depending upon the use of the bearing, it will be appreciated that normally one of the races will be stationary, while the other will be rotatable, although each may be rotatable in some installations. For example, if the bearing is to be used for bearingly mounting a shaft to a housing, the shaft would extend through the opening in the inner race and be rotatable with the inner race, while the outer race would be held in a fixed housing. In this respect, the inner race would be movable relative to the outer race when the bearing is in use. The opposite situation would be where the inner race would be mounted on a spindle that would not rotate and the outer race would be engageable and associated with a rotatable member. For purposes of illustrating the invention, it will be assumed that the inner race 11 is rotatable and the outer race 12 is normally fixed or stationary.

During normal bearing usage, it will be appreciated that the grease or lubricant 19 would flow outwardly toward the seal members 18 and somewhat outwardly toward the fixed race 12. The present invention functions to provide a means for diverting that grease from the build-up areas back to the ball members and ball grooves. This is accomplished by diverter or scraper members 22 that are in the form of triangular in cross section bars mounted on and extending from the outer periphery of the inner movable race 11 at positions adjacent to the seal members 18.

The diverter members extend radially outward from the inner race and include inclined vertical faces 22a and 22b directed toward the ball members 15 and the ball grooves and a rear face 22c generally parallel to and directed toward a respective seal member 18. The dual inclined faces 22a and 22b function to direct or move lubricant building up along the seal members and/or the outer race toward the rolling members or ball members 15 depending upon the direction of movement of the inner race to the outer race. In one direction of movement, one of the faces will function to cause the movement of the grease, while in the other direction the other face will cause movement of the grease. The angle of incline for the faces 22a and 22b may be according to the design needs of the bearing but such as to adequately wipe the grease off the seal members and force it back to the ball members. By forcing the lubricant back to the surfaces between the ball members and the races, it can be appreciated that better lubrication of the bearing will be accomplished to materially increase the life of the bearing. In essence, more lubricant is available to the bearing surfaces to reduce wear of the bearing members and thereby increase bearing life.

While the diverter members are shown to be mounted on the inner race, it will be appreciated that they could be mounted on the outer race, or on both the inner and outer races. Further, while only two diverter members are shown in the illustrated embodiment, any number may be used.

It will be understood that modifications and variations may be effected without departing from the scope of the novel concepts of the present invention, but it is understood that this application is to be limited only by the scope of the appended claims.

The invention is hereby claimed as follows:

1. A bearing comprising, concentric inner and outer races, at least one of said races adapted to be rotatable, an annular cage member disposed concentrically between said races, said cage member having a plurality of spaced apart pockets, rolling elements received in said pockets and in rolling engagement with said races, lubricant consisting of grease between the races and over said cage member and rolling elements, annular seal members spaced outwardly of said cage member and rolling elements and between the races to prevent leakage of said lubricant, and means on one of the races for directing lubricant from locations or ordinary build-up back toward the cage member and rolling elements thereby maximizing lubrication of the bearing, said means including at least one diverter wiping the lubricant from the seal areas and forcing it back toward said rolling elements.

2. A bearing as defined in claim 1, wherein said rolling elements are balls.

3. A bearing as defined in claim 1, wherein each diverter includes inclined surfaces facing said rolling elements.

4. A bearing as defined in claim 3, wherein said inclined surfaces include one operable to wipe the grease during relative rotation of the races in one direction and one operable in the opposite direction.

5. A bearing as defined in claim 1, wherein said diverters include a pair mounted on the inner race and at diametrically opposed positions.

6. A bearing comprising, concentric inner and outer races, an annular cage member disposed concentrically between said races, said cage member having a plurality of circumferentially spaced apart pockets, ball members in said pockets in engagement with said races, grease between the races and over said cage member and ball members, annular seal members between the races to retain the grease within the races, and diverters on the inner race outward of said cage member for directing grease toward the ball members.

* * * * *